US006783082B2

(12) United States Patent
Renyer et al.

(10) Patent No.: US 6,783,082 B2
(45) Date of Patent: Aug. 31, 2004

(54) ROTARY ATOMIZER

(75) Inventors: James H. Renyer, Sabetha, KS (US); Gregory A. Renyer, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 0 days.

(21) Appl. No.: 10/293,377

(22) Filed: Nov. 12, 2002

(65) Prior Publication Data

US 2003/0079682 A1 May 1, 2003

Related U.S. Application Data

(62) Division of application No. 09/726,967, filed on Nov. 29, 2000, now Pat. No. 6,551,402.

(51) Int. Cl.[7] .............................. B05B 3/10; B44D 5/10; A01C 17/00; A01C 19/00

(52) U.S. Cl. ........................................ 239/223; 239/668

(58) Field of Search ................................ 239/223, 668, 239/669, 681, 687, 689, 222

(56) References Cited

U.S. PATENT DOCUMENTS 1,869,296 A * 7/1932 Beiler ........................ 239/223
2,992,778 A * 7/1961 Martin ....................... 239/223
3,229,912 A * 1/1966 Waldrum ................. 239/225.1
3,706,417 A * 12/1972 Patrick ....................... 239/222
3,719,168 A * 3/1973 Kazee ........................ 118/306
3,720,737 A * 3/1973 Klaphaak et al. .............. 264/8
4,430,155 A * 2/1984 Kozischek et al. .......... 159/4.2
5,037,029 A * 8/1991 Garet et al. .................... 239/77
5,226,605 A * 7/1993 Bazergui et al. ............... 239/1
6,062,487 A * 5/2000 Bedetti .......................... 239/7

* cited by examiner

*Primary Examiner*—William C. Doerrler
(74) *Attorney, Agent, or Firm*—Hovey Williams LLP

(57) ABSTRACT

A system utilizing a rotary atomizer for applying a liquid based substance to particles. In one example, a motor provides an in-line, direct drive force on a cage atomizer. With some systems, the cage atomizer has a vertical axis of rotation. With some systems, the motor is mounted external to the particle path and supported by a housing structure that provides an angled particle path. With some systems, other types of rotary atomizers may be used such as disk, bowl, or hollow disk rotary atomizers. With some examples of cage atomizers, a first portion of the cage atomizer may include a thread set that screws to a thread set of a second portion to hold a perforated structure in place. With some systems, the thread sets surround the axis of rotation.

18 Claims, 7 Drawing Sheets

ROTARY ATOMIZER

RELATED APPLICATION

This is a division of application Ser. No. 09/726,967 filed Nov. 29, 2000 now U.S. Pat. No. 6,551,402.

BACKGROUND OF THE INVENTION

1. Field of the Invention

This invention relates to rotary atomizers.

2. Description of the Related Art

Rotary atomizers may be utilized in applying a liquid based substance to particles. An example of such an application is in the treatment of seeds (e.g., wheat, barley, rice, corn, beans, peas, grass seeds oats, and cotton seeds) with pesticides, fungicides, and/or fertilizer prior to the planting of the seeds in the ground. Another example is the application of liquid fat to dog food pellets. Liquid provided to a rotary atomizer rotating at a high rate of speed is broken up in smaller portions and projected outwardly by the centrifugal force of the rotating rotary atomizer so as to aid in their application to the particles. Examples of rotary atomizers include disk, brush, bowl-like, and cage rotary atomizers.

Because rotary atomizers typically require a high speed rotational force within the vicinity of moving particles (as with a continuous flow process), machinery that utilizes rotary atomizers can be somewhat complicated, requiring several moving parts which can be subject to frequent breakdowns. Also, because dust may accompany some particles, the machinery utilizing a rotary atomizer may require frequent disassembly for cleaning. Furthermore, it may be desirable for a machine utilizing a rotary atomizer to be compact for easy movement, utilization, and/or storage. In light of these criteria, the machinery must be designed to efficiently apply a liquid based substance to the particles.

SUMMARY OF THE INVENTION

It has been discovered that providing a simplified design and/or utilization of a rotary atomizer may advantageously provide a machine that is efficient, reliable, easier to repair and maintain, and/or compact while still being efficient in the application of liquid based substances to particles.

In one aspect, the invention includes an apparatus for applying a liquid based substance to particles. The apparatus includes a particle path housing defining a particle path. The particle path housing includes a first housing structure to provide an angled particle path. The apparatus also includes a rotary atomizer located to provide a zone of atomized liquid within the particle path. The rotary atomizer has a generally vertical axis of rotation. The apparatus further includes a shaft coupled to provide a rotational force on the rotary atomizer. The shaft extends though a wall of the first housing structure. The apparatus also includes a motor located beneath the rotary atomizer external to the angled particle path. The motor is coupled to the shaft to provide an in-line rotational force on the rotary atomizer.

In another aspect of the invention, an apparatus for applying a liquid based substance to particles includes a particle path housing defining a particle path and a cage atomizer located to provide a zone of atomized liquid within the particle path. The apparatus also includes a motor located beneath the cage atomizer. The motor has a shaft to provide an in-line rotational force on the cage atomizer.

In another aspect of the invention, an apparatus for applying a liquid based substance to particles includes a particle path housing defining a particle path and a cage atomizer located to provide a zone of atomized liquid within the particle path. The cage atomizer has a generally vertical axis of rotation. The apparatus also includes a motor having a shaft coupled to the cage atomizer to provide a direct drive rotational force on the cage atomizer.

In another aspect, the invention includes a cage atomizer having an axis of rotation. The cage atomizer includes a first support structure, a second support structure, and a perforated structure located between the first and second support structures. The rotation of the atomizer provides a centrifugal force on a liquid based substance through the perforated structure. The cage atomizer also includes a first set of threads surrounding the axis of rotation and fixably coupled to the first support structure and a second set of threads surrounding the axis of rotation and fixably coupled to the second support structure. The first and second support structures are coupled at least via an engagement of the first and second sets of threads.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
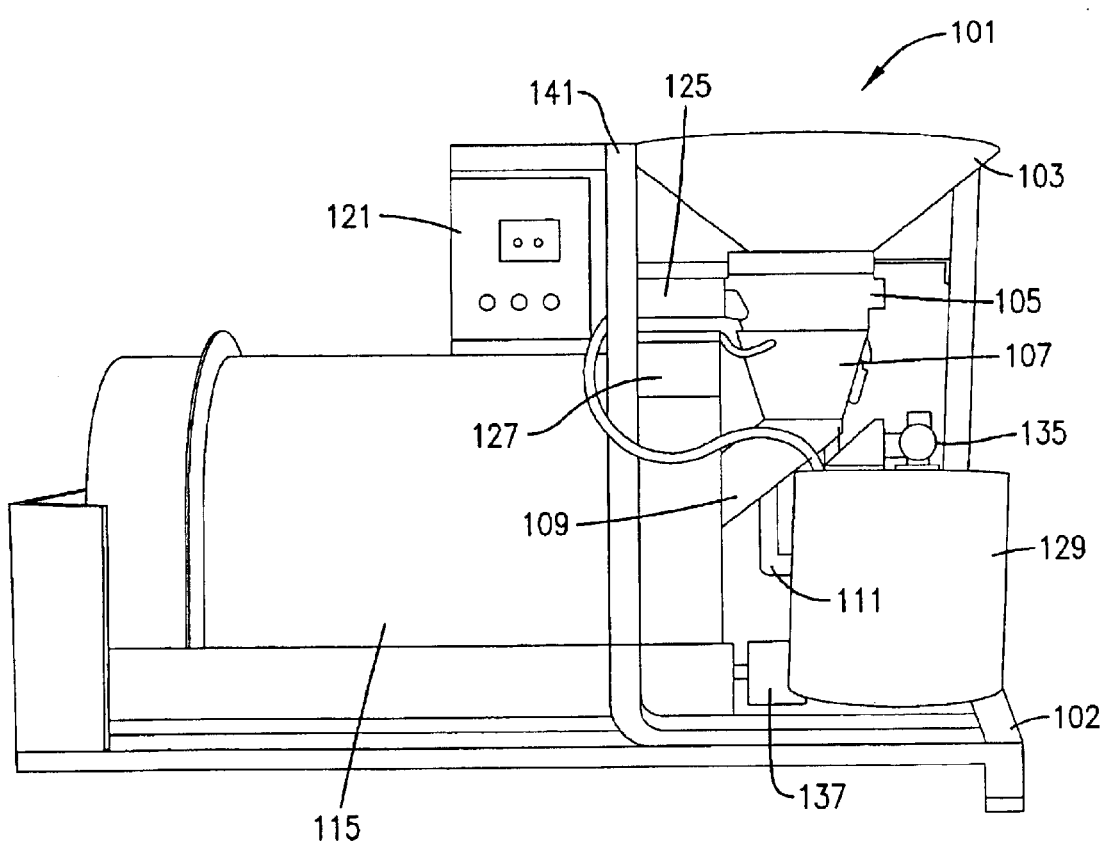
FIG. 1 is a side view of an example of an apparatus utilizing a rotary atomizer according to the present invention.

FIG. 1 is an example of a seed treater according to the present invention. Seed treater 101 is utilized to treat a variety of seeds with a liquid based substance that may include e.g., pesticides, fungicides, and/or fertilizers. An example of a seed treater is the LP800 unit sold by UNIVERSAL SEED CARE of Sabetha, Kans. Treater 101 includes a seed supply hopper 103 for receiving the seed to be treated. In one example, hopper 103 has a 3 bushel capacity and can receive seed from either bags or from a continues belt or auger fed supply. Seed flows from hopper 103 to choke chamber 105, which includes a manual choking mechanism (see FIG. 2) to control the rate of seed flow. The seed then flows into atomizing chamber 107 where the seed passes through a zone of atomized liquid generated by a rotary atomizer (e.g., cage atomizer 230, see FIG. 2). The rotary atomizer (not shown in FIG. 2) is rotated by motor 111, which is supported from angled seed chute 109. The seed passes from chamber 107 via seed chute 109 to mixing drum 115, wherein a secondary mixing of the seed and liquid takes place. In one example, mixing drum 115 is turned by a 1 Hp, 220V motor 137 to provide secondary mixing. The seed then exits out an opening on the left end of drum 115, relative to the view shown in FIG. 1. In one example, mixing drum 115 includes four paddles set 1" off of the inner side of the drum and four paddles set 2" off of the inner side of the drum with the paddles positioned at a slight angle to push the seed along. With other examples, other types of conventional mixing drums may be used.

Seed treater 101 includes a mixing tank 129 and a mixing motor 135 for mixing the liquid based substance to be atomized. In one example, tank 129 is a 27 gallon stainless steel tank. Seed treater 101 also includes a metering pump 125 and a calibration and processing unit 127. In one example, metering pump 125 is a 1/10 Hp variable pump allowing for a variable amount of liquid based substance to be provided to the rotary atomizer. Seed treater 101 further includes a control panel 121 supported by a frame member 141. Other components of seed treater 101, including drum 115, tank 129, and chamber 107, are supported by frame 102. In one example, seed treater 101 can apply liquid to 15.8 bushels per minute of seed at the rate of 63.2 ounces per minute.

FIG. 2 is a side cutaway view of a particle path housing according to the present invention. Seed enters from the top of hopper 103 and flows downward into a cylindrically shaped choke chamber 105. A choking mechanism located in chamber 105 is utilized to control the rate of seed flow into atomizing chamber 107. In the example shown, choking mechanism includes an inverted choke cone 212 that surrounds an interior stationary diversion cone 211, which is mounted in choke chamber 105 with three evenly spaced, 3.5" mounting brackets 209 welded to the interior walls of choke chamber 105. Handles 214 are fixably coupled to move inverted choke cone 212 in a vertical direction with respect to stationary cone 211 to control the rate of seed flow. In one example, the walls of choke chamber 105 are made from 14 gauge steel.

A cage atomizer 230 is located inside atomizing chamber 107. Cage atomizer 230 includes a perforated steel structure 231 that, when rotated, generates a zone of atomized liquid (whose approximate location is shown by clouds 234) emanating from the perforations of perforated steel structure 231. The liquid is applied to cage atomizer 230 from the interior side of perforated steel structure 231. In the example of FIG. 2, liquid is applied to the interior of perforated steel structure 231 via a pipe (e.g., 309), tube 251, and connector coupling 252 mounted in the wall of atomizing chamber 107. A rubber seal 257 located above cage atomizer 230 is attached to tube 251. In one example, perforated steel structure 231 includes 30 micron diameter perforations. In other examples, various types of wire mesh or screens having different perforated sizes may be utilized. With cage atomizers such as, e.g. the type shown in FIG. 3, perforated structures of different perforation sizes may be utilized depending upon the type of liquid and/or the size of the atomized portions desired. With some treaters, the cage atomizer includes a porous material located adjacent to the interior side of perforated structure 231.

After exiting chamber 107, seed flows down angled seed chute 109 into mixing barrel 115 (See FIG. 1). In one example, the walls of chamber and seed chute 109 are made from 12 gauge steel.

Motor 111 is coupled to cage atomizer 230 via motor shaft 261, coupling 260, and shaft 233 to provide an in-line, direct drive rotational force on cage atomizer 230. Coupling a motor to a rotary atomizer in such a configuration may advantageously provide a treater that is simplified in operation with minimal moving parts. Shaft 233 extends up through the bottom wall of seed chute 109 in a pipe 235 that is welded to the bottom wall of chute 109. Pipe 235 is also fixably coupled to the wall of chamber 107 via three evenly spaced, 3½" mounting brackets 215 (two shown in FIG. 2). Motor 111 is mounted to bracket 263, which is welded to the outerside of the bottom wall of seed chute 109. In one example, motor 111 is a single phase, 220V, 1/3 Hp motor. In one example, pipe 235 is a schedule 40 pipe having a 1" diameter, and shaft 233 is a steel rod with a "5/8 diameter.

Providing a motor beneath the rotary atomizer with a shaft extending up through the angled seed chute wall allows for the motor to provide an in-line, direct drive rotational force on the rotary atomizer and yet allows the motor to remain external to the seed path. Allowing the motor to remain external to the seed path reduces its susceptibility to failure from dust as well as allows the motor to operate at cooler temperatures. Furthermore, having a motor that is external to the seed path also provides for easier maintenance.

Atomizing chamber 107 is secured to and supported from choke chamber 105 via handled clamps 217 mounted to the exterior side of the wall of atomizing chamber 107. When engaged, handled clamps 217 engage structures of the choke chamber flange 248. Atomizing chamber 107 can be removed from choke chamber 105 by disengaging handle clamps 217. Seed chute 109 includes a lip that engages flange 266 of atomizing chamber 107 to secure seed chute 109 to atomizing chamber 107. With other examples, chute 109 may be welded or bolted to chamber 107. By disengaging handles 217 and disconnecting the liquid supply tubes and motor cables (not shown), atomizing chamber 107, chute 109, motor 111, pipe 235, and atomizer 230 can be removed from seed treater 101 as a unit, thereby providing for easier maintenance of the system.

FIG. 3 shows a cutaway view of an example of a portion of a cage atomizer according to the present invention. The dimensions shown in FIG. 3 are in inches. Atomizer 301 includes a top portion 303 and a bottom portion 305. Top portion 303 includes a stainless steel disk 307 and a stainless steel pipe 309 welded to disk 307. Disk 307 includes a center hole 311 with a notch cut on the bottom side (relative to the view shown in FIG. 3) to accommodate the outer diameter of pipe 309. Threads 315 are located on the bottom interior side of pipe 309. With other examples, the entire inner side of pipe 309 may be threaded.

Bottom portion 305 includes a solid stainless steel cylinder 321 welded to disk 323. Prior to the insertion of cylinder 321 through the center hole of disk 323, a chamfer 386 is made on the top inner side 326 of disk 323. Afterwards, a weld (not shown) is made in the chamfer to weld disk 323 to cylinder 321. Cylinder 321 includes a hole 333 at the bottom end for insertion of a shaft (e.g., 233) to couple atomizer 301 to a motor (e.g., 111). A threaded bolt hole 335 extends from hole 333 to the exterior of cylinder 321 for securing cylinder 321 to a shaft (e.g., 233). Cylinder 321 also includes threads 343, which in one example are cut after cylinder 321 is welded to disk 323. In some examples, a groove is located on the bottom side of disk 323 to prevent liquid from traveling from disk 323 down to the shaft (e.g., 233).

Top portion 303 is screwed to bottom portion 305 via threads 315 and 343 to couple top portion 303 to bottom portion 305. Screwing threads 315 and 343 together brings disk 307 closer to and disk 323 closer.

Top disk 307 and bottom disk 323 each include two sets of grooves, each of which opposes a groove on the other disk. Top disk 307 includes groove 361, which opposes groove 365 of disk 323, and groove 363, which opposes groove 367. The grooves are cut in the disks after the welding of pipe 309 or cylinder 321 to its respective disk. Each groove (361, 363, 365, and 367) encircles the center portion of the disk. Each groove is capable of receiving a portion of the perforated structure (e.g., perforated steel structure 231) to secure the perforated structure to atomizer portions 303 and 305. To install a perforated structure in rotary atomizer 301, an end portion of the perforated structure is placed in the desired groove (either 365 or 367) of bottom portion 305. Top portion 303 is then screwed to bottom portion 305 where the opposing end of the perforated structure resides in the corresponding opposing groove (either 361 or 363) of top disk 307. Screwing top portion 303 and bottom portion 305 together brings top disk 307 and bottom disk 323 closer together to hold the perforated structure in the opposing set of grooves.

Having two sets of grooves allows atomizer 301 to hold a perforated structure at two different locations with respect to the axis of rotation 341. With some cage atomizers, two perforated structures can be utilized with the one perforated structure radially closest to the axis of rotation 341 including larger perforations than the one located radially farther away from axis of rotation 341. Other cage atomizers may include only one set of grooves, which, in some examples, are located at the positions of grooves 361 and 365.

Because of the screwable coupling of the top portion 303 with the bottom portion 305, atomizer 301 provides for an easier change out and/or cleaning of the perforated structure. To remove a perforated structure, top portion 303 is unscrewed from bottom portion 305. Referring back to FIG. 2, because atomizer 230, motor 111, and chamber 107 are removable as a unit, one can change out perforated structure 231 by disengaging handles 217 and disconnecting the liquids supply tubes and motor cables (not shown) to access the top portion of cage atomizer 230 to unscrew it from the bottom portion of cage atomizer 230. Consequently, perforated structure 231 can be accessed without having to remove the bottom portion of the atomizer from chamber 107. Such a feature reduces the time needed to changeout or clean a perforated structure of a cage atomizer in a seed treater. Referring back to FIG. 3, pipe 309 includes holes 317 for liquid to pass from the interior of pipe 309 to the perforated structure. Liquid is provided to the interior of pipe 309 via the hole in the center of disk 307 and the opening at the top end of pipe 309.

Figure 3:
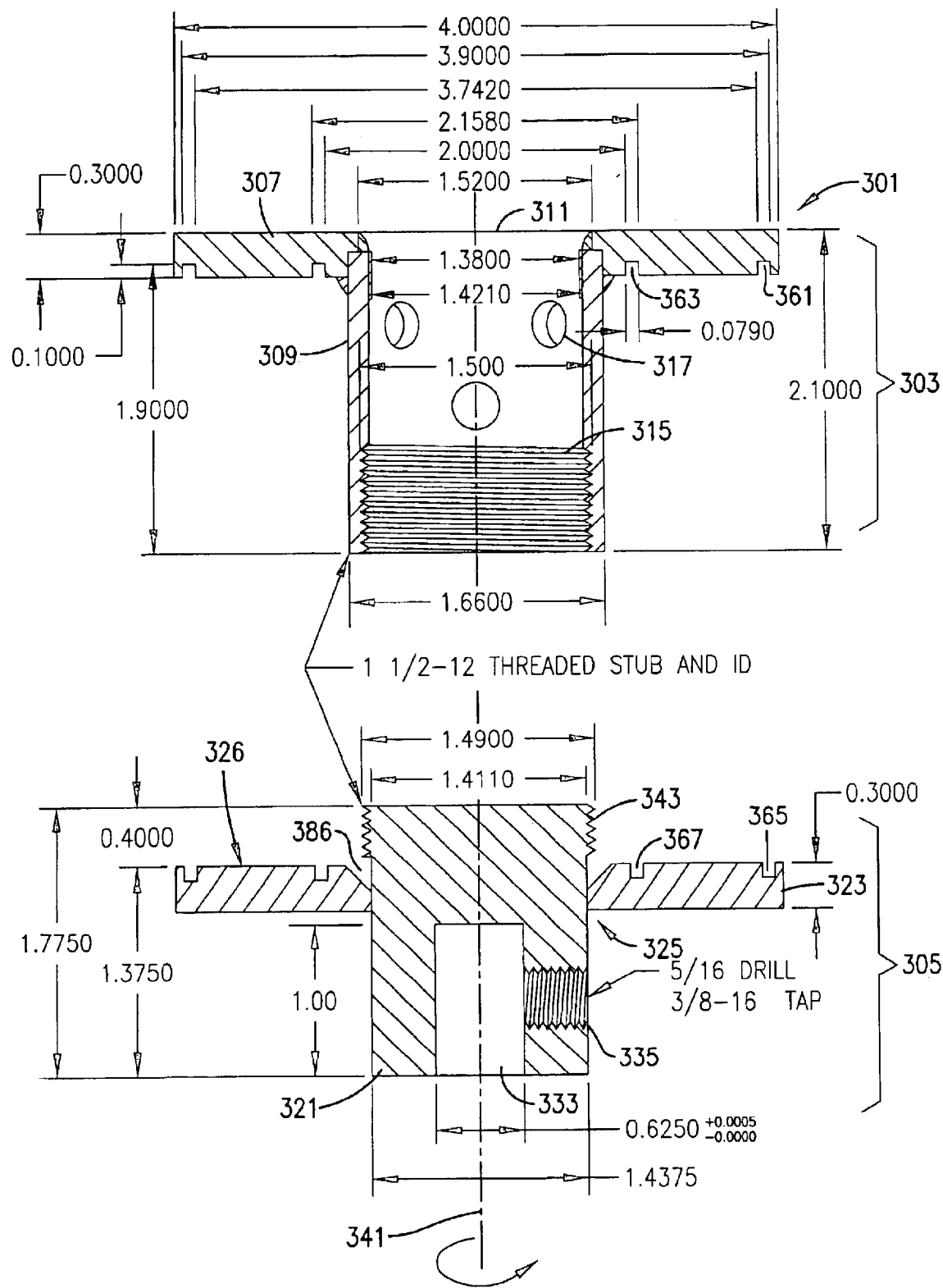
FIG. 3 is a cutaway view of an example of a portion of a rotary atomizer according to the present invention.

In FIG. 3, the center of rotation 341 of atomizer 301 is the axial center of pipe 309 and solid cylinder 321. With some systems, the seed treater is designed such that the bottom portion 305 is rotated in the same direction as that to screw bottom portion 305 into top portion 303, so as to prevent top portion 303 from spinning off during operation.

Figure 4:
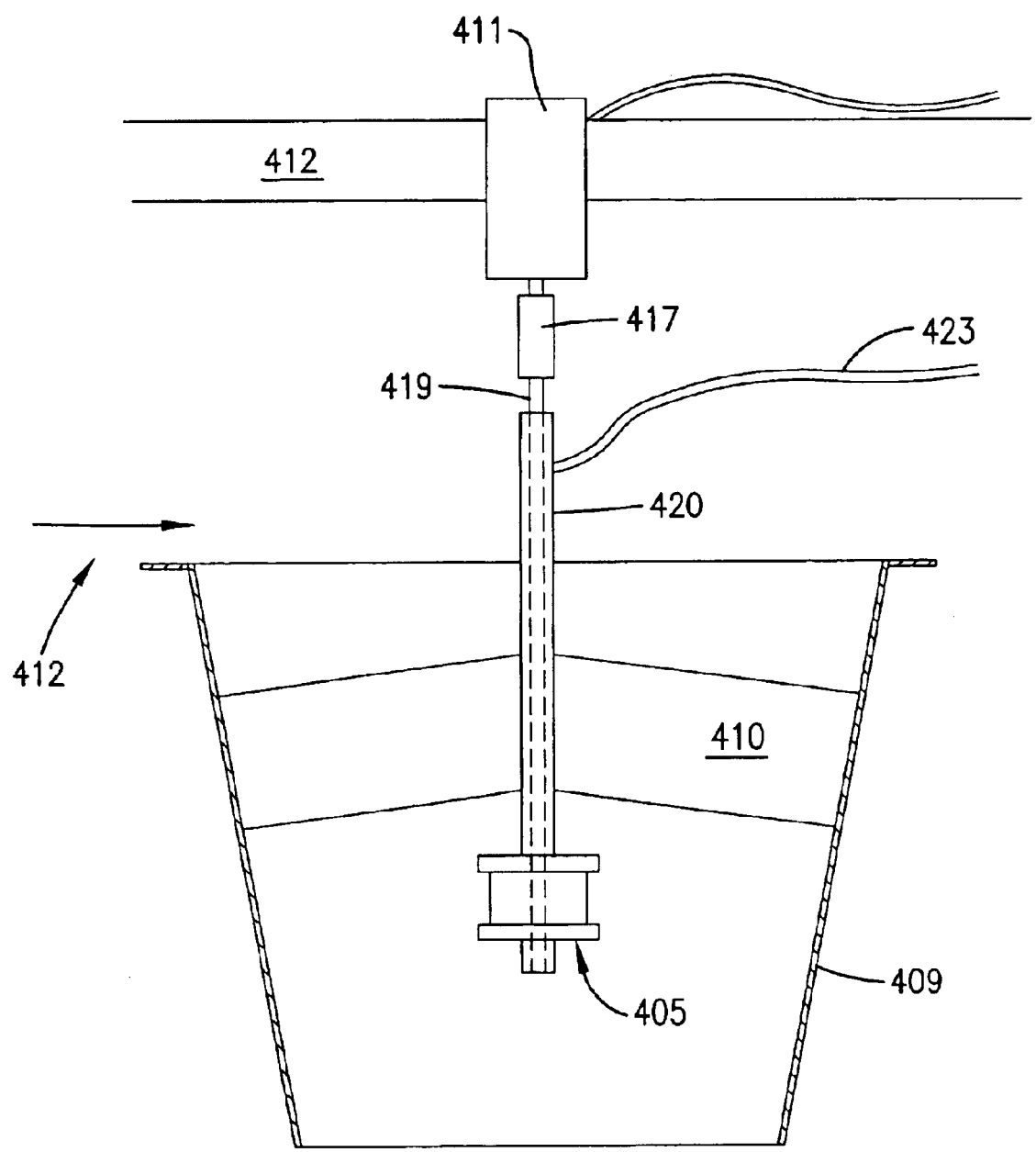
FIG. 4 is a cutaway view of an example of a portion of a particle path housing showing a rotary atomizer according to the present invention.
Figure 5:
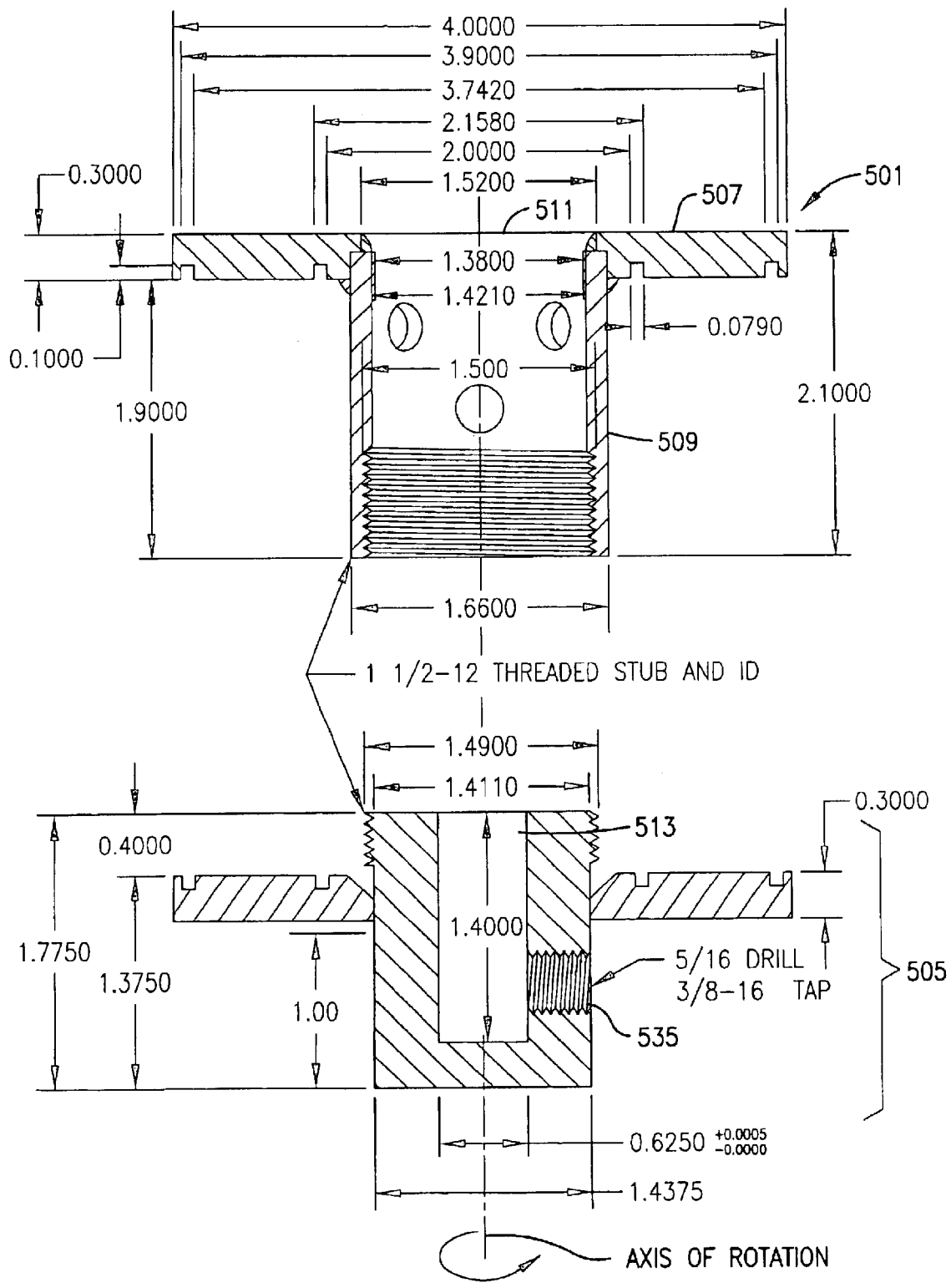
FIG. 5 is a cutaway view of an example of a portion of a rotary atomizer according to the present invention.

FIG. 4 is a partial cutaway view of another example of an atomizing chamber according to the present invention. A cage atomizer 405 is located in atomizing chamber 409. Motor 411 is coupled to provide an in-line, direct drive rotational force on cage atomizer 405 via coupling 417 and shaft 419. A more detailed example of cage atomizer 405 is shown in FIG. 5. Motor 411 is located above atomizer 405 and is mounted to brackets 412. Motor 411 may be located beneath a stationary cone (e.g., 211) or mounted to a seed treater frame (e.g., 102). With some systems, seed (or other types of particles) may be fed into chamber 409 via a side auger or belt from the direction shown by arrow 412. Liquid is fed to cage atomizer 405 via tube 423 and stationary pipe 420. Stationary pipe 420 is mounted to the walls of chamber 409 via three, evenly spaced mounting brackets 410 (with two shown in FIG. 4). A seal (not shown) is located between the bottom end of pipe 420 and the top portion of cage atomizer 405. Seed exits chamber 409 via a bottom opening to other path housing structures (not shown in FIG. 4).

FIG. 5 shows a cutaway view of an example of a portion of a cage atomizer according to the present invention. The dimensions shown in FIG. 5 are in inches. Cage atomizer 501 is similar to cage atomizer 301 of FIG. 3 except that atomizer 501 is designed to be coupled to a shaft (e.g., 419) inserted into center hole 511 of disk 507 and extending into the interior of pipe 509 to hole 513 of bottom portion 505. The shaft is secured in hole 513 via a bolt screwed into threaded hole 535.

Figure 6:
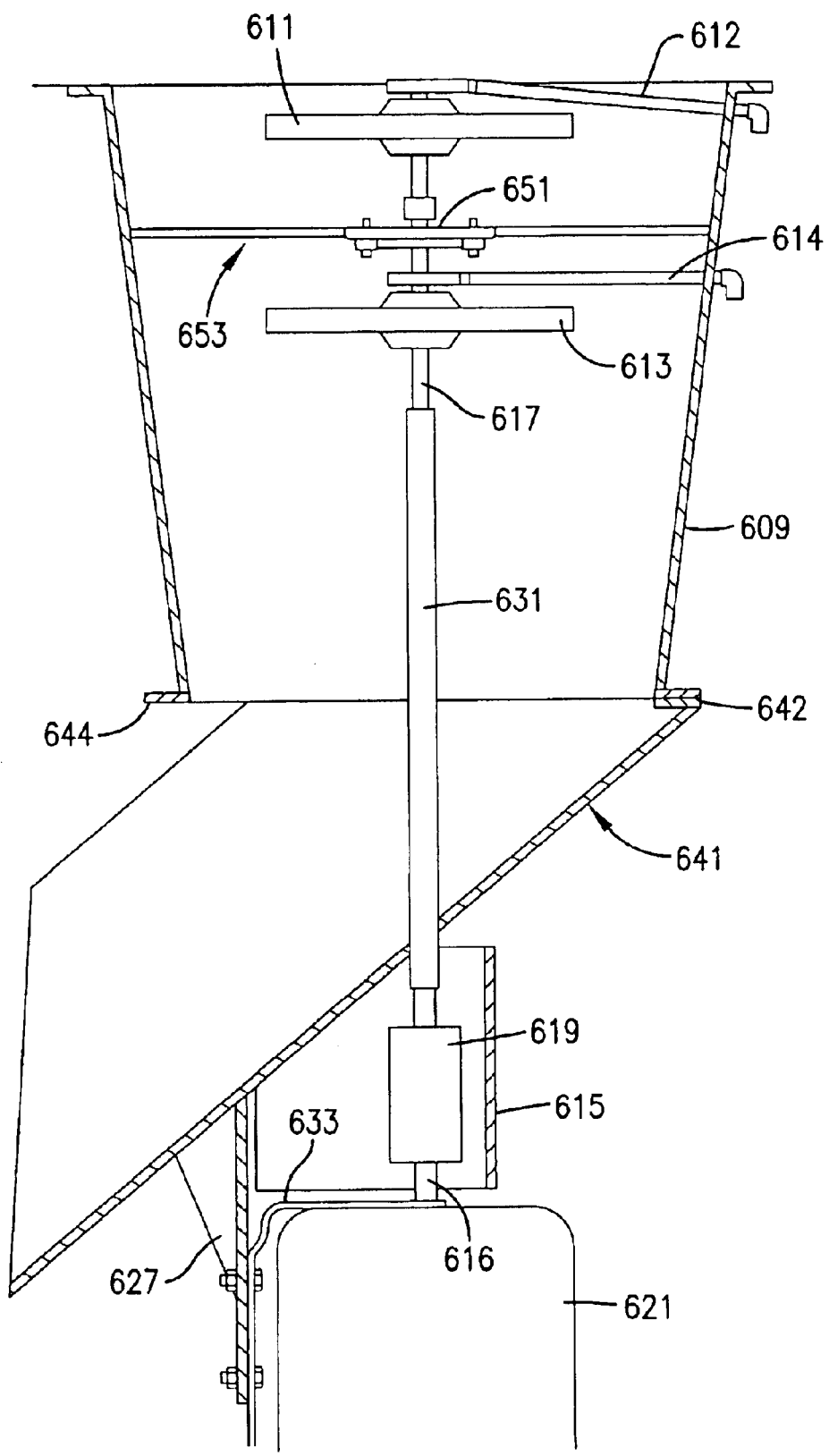
FIG. 6 is a cutaway view of an example of a portion of a particle path housing showing two rotary atomizers according to the present invention.

FIG. 6 is a cut away view of an atomizing chamber 609 and seed chute 641 according to the present invention. The equipment shown in FIG. 6 may be implemented in a treater similar to that shown in FIG. 1. Located in chamber 609 are two hollow disk rotary atomizers 611 and 613 which are similar in design to a pump impeller. Liquid is provided to hollow disk atomizers 611 and 613 via tubes 612 and 614, respectively. Hollow disk atomizers 611 and 613 include internal channels that provide the liquid to the edge of hollow disk atomizers 611 and 613 when rotated. Motor 621 is coupled to provide an in-line, direct drive force on hollow disk atomizers 611 and 613 via motor shaft 616, coupling 619, and shaft 617. Shaft 617 extends through the interior of pipe 631, which is welded to the bottom wall of chute 641. Shaft 617 is coupled to a bearing 651 mounted to brackets 653. Utilizing two atomizers increases the amount of atomized liquid available to treat seed. Chute 641 includes a lip 642 located at its top that engages a flange 644 located at the bottom of chamber 609. With other systems, chute 641 may be secured to chamber 609 via other techniques such as, e.g., bolts or welding.

Motor 621 includes a mounting brace 633 for mounting motor 621 to bracket 627. Bracket 627 is welded to the bottom wall of chute 641. A rotational guard 615 (shown in cutaway view) is welded to the bottom wall of chute 641. The equipment shown in FIG. 6 is designed to be removable as a unit from a treater.

Figure 7:
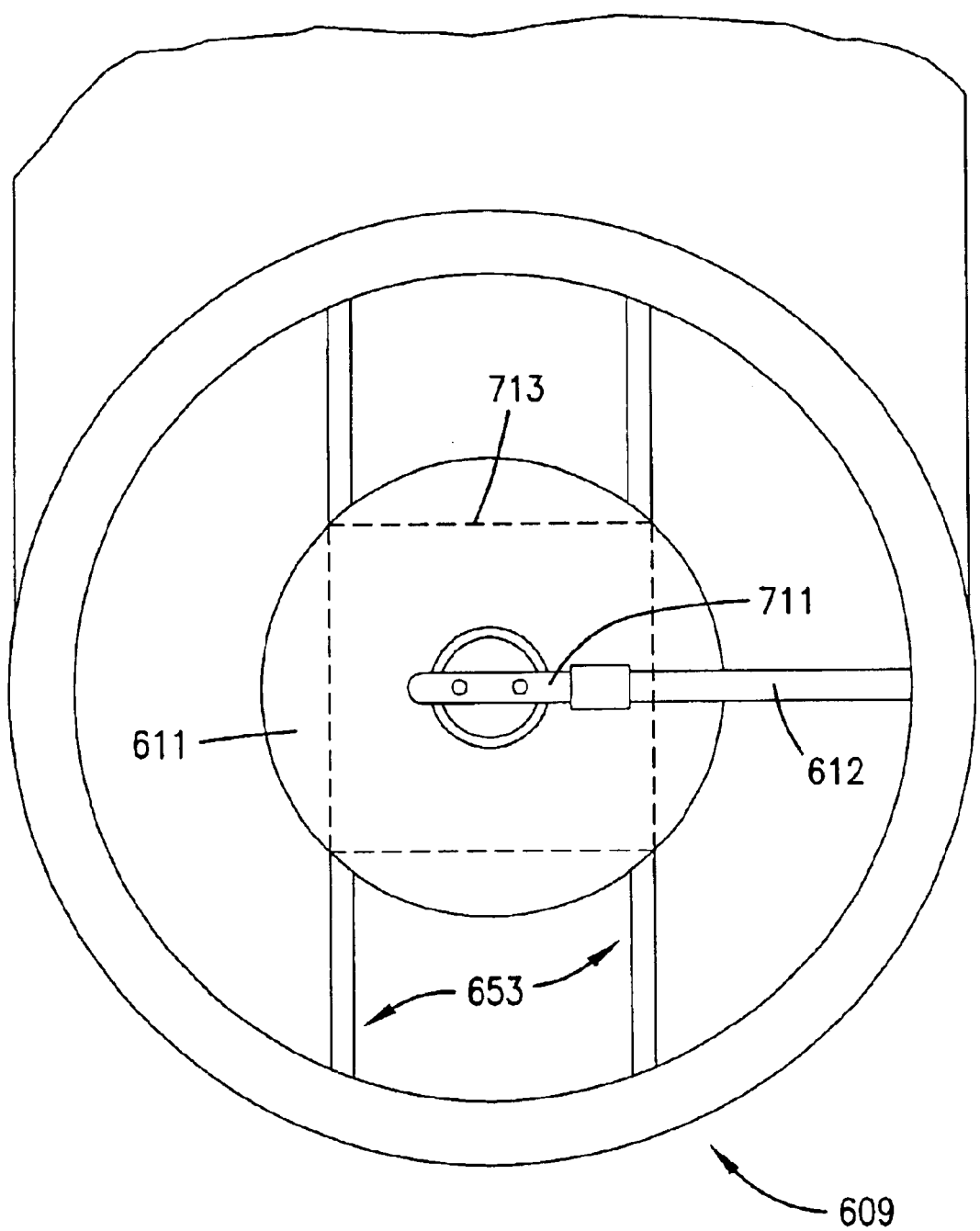
FIG. 7 is a top view of an example of a portion of the particle path housing of FIG. 6.

FIG. 7 shows a top view of atomizing chamber 609. Bearing 651 (not shown in FIG. 7) is located in bearing housing 713 (shown in phantom) which is mounted to brackets 653. Hollow disk atomizer 611 includes an opening for liquid to enter from tube tip 711.

Those of skill in the art will recognize that, based upon the teachings herein, several modifications may be made to the embodiments shown in FIGS. 1–7 and described herein. For example, features shown or described with respect to a system shown in one drawing or described herein may be utilized in the systems shown in other drawings or described herein. For instance, a mounting bracket similar to mounting bracket 627 may be utilized in the system of FIG. 2. Also different types of rotary atomizers may be utilized in the systems shown in FIGS. 2, 4, and 6 and described herein. For example, a brush, hollow disk, bowl, or disk rotary atomizer may be utilized in the atomizing chamber of FIG. 2. Also, two cage atomizers may be utilized in FIG. 6.

Figure 2:
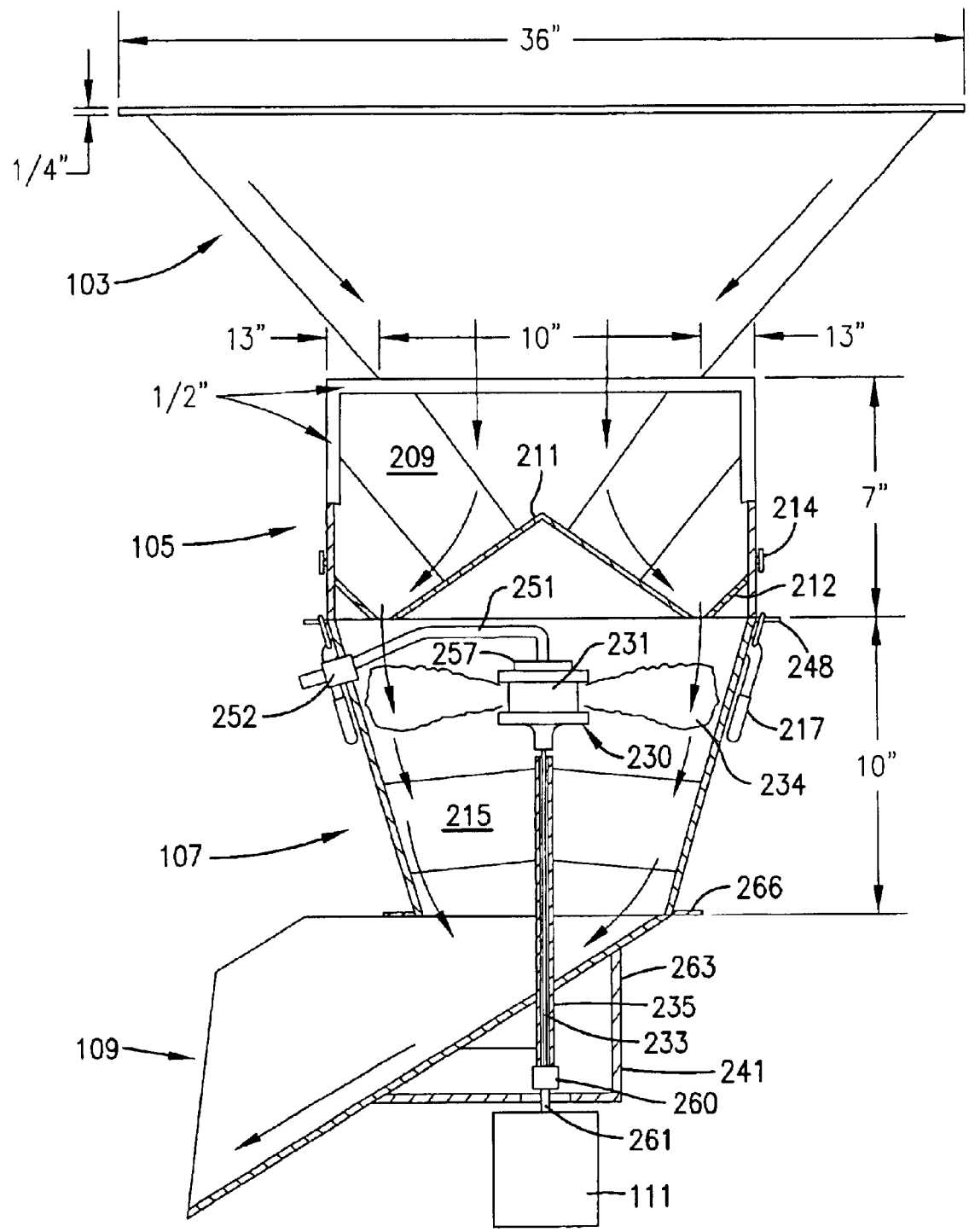
FIG. 2 is a cutaway view of an example of a particle path housing showing a rotary atomizer according to the present invention.

Furthermore, cage atomizers of different designs may be utilized in the systems of FIGS. 2, 4, and 6. It is understood that the dimensions shown in the Figures as well as the specific designs shown or described are given as examples and not as limitations to the invention. Furthermore, those of skill in the art will recognize, based upon the teachings herein, that such dimensions and designs may be modified. In addition, the treating systems shown or described may be utilized to apply liquid to other particle types such as feed pellets. Also, the atomizers shown or described may be utilized in other liquid application systems having different configurations. Examples of such configurations include a system that does not utilize a secondary mixing barrel or a system that treats particles in a batched process.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A cage atomizer apparatus having an axis of rotation comprising:

a first, upper support structure having an upright hollow tubular body presenting a liquid based substance inlet and a depending sidewall, said sidewall having at least one aperture therethrough for passage of said liquid through the aperture;

a second support structure disposed below said first structure;

a perforated structure located between the first and second support structures, the rotation of the atomizer providing centrifugal force on said liquid based substance passing through said aperture and then through the perforated structure;

a first set of threads surrounding the axis of rotation and fixably coupled to the first support structure;

a second set of threads surrounding the axis of rotation and fixably coupled to the second support structure;

wherein the first and second support structures are coupled at least via an engagement of the first and second sets of threads.

2. The apparatus of claim 1 wherein the perforated structure includes a screen.

3. The apparatus of claim 1 wherein the perforated structure includes perforated steel.

4. The apparatus of claim 1 wherein:

the first support structure defines a first groove;

the second support structure defines a second groove;

the perforated structure includes a first end located in the first groove and a second end located in the second groove.

5. The apparatus of claim 4 wherein:

the first support defines a third groove, radially closer to the axis of rotation than the first groove;

the second support defines a fourth groove, radially closer to the axis of rotation than the second groove, the fourth grove opposing the third groove.

6. The apparatus of claim 4 further wherein the first and second grooves surround the axis of rotation.

7. The apparatus of claim 1 further comprising:

a cylindrical structure fixably coupled to the first structure and having a center axis located generally at the axis of rotation, the cylindrical structure defining at least one hole for liquid to pass from an interior of the cylindrical structure to the exterior of the cylindrical structure between the first and second support structures.

8. The apparatus of claim 1 wherein:

the first structure includes a first disk, the first disk defining a first groove;

the second support structure includes a second disk, the second disk defining a second groove;

the perforated structure includes a first end located in the first groove and a second end located in the second groove.

9. The apparatus of claim 1 wherein the first and second sets of threads are located between the first and second support structures.

10. The apparatus of claim 1 wherein the unscrewing of the first set of threads from the second set of threads moves the first support structure away from the second support structure.

11. The apparatus of claim 1 wherein the unscrewing of the first set of threads from the second set of threads moves the first support structure away from the second support structure thereby allowing for the removal of the perforated structure.

12. A rotatable cage atomizer comprising upper and lower spaced apart structures, an elongated central shall assembly defining the axis of rotation of the cage atomizer extending between and interconnecting the first and second structures, said shaft assembly comprising a hollow tubular body secured to said upper support structure and presenting a liquid based substance inlet and a depending sidewall, said sidewall having at least one aperture therethrough for passage of liquid through the aperture, and a perforated structure surrounding the shaft assembly between the upper and lower structures, said shaft assembly having threading surrounding said axis of rotation permitting disassembly of the atomizer.

13. The cage atomizer of claim 12, said perforated structure comprising a screen.

14. The cage atomizer of claim 12, said perforated structure comprising perforated steel.

15. The cage atomizer of claim 12, said upper and lower structures each including a corresponding groove, said perforated structure being seated within said grooves.

16. The cage atomizer of claim 12, said first and second structures comprising first and second disks.

17. The apparatus of claim 1, said second structure including an upwardly extending cylindrical body.

18. The apparatus of claim 17, said first structure including a first disc welded to said tubular body, and the second structure including a second disc welded to said cylindrical body.

* * * * *